(12) United States Patent
Rathbun et al.

(10) Patent No.: US 8,190,518 B2
(45) Date of Patent: May 29, 2012

(54) METHOD AND SYSTEM FOR PERFORMING MONETARY TRANSACTIONS FROM MULTIPLE SOURCE ACCOUNTS

(75) Inventors: Darryl T. Rathbun, Stratford, CA (US); Alexandra Mack, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 863 days.

(21) Appl. No.: 11/640,635

(22) Filed: Dec. 18, 2006

(65) Prior Publication Data
US 2008/0147549 A1 Jun. 19, 2008

(51) Int. Cl.
*G06Q 40/00* (2012.01)
(52) U.S. Cl. ............................................ 705/39; 705/40
(58) Field of Classification Search .................... 705/39, 705/40
See application file for complete search history.

(56) References Cited

U.S. PATENT DOCUMENTS

| | | | | |
|---|---|---|---|---|
| 6,868,391 | B1 * | 3/2005 | Hultgren | 705/26 |
| 2002/0174066 | A1 * | 11/2002 | Kleckner et al. | 705/39 |

* cited by examiner

*Primary Examiner* — Thomas Dixon
*Assistant Examiner* — Benjamin S Fields
(74) *Attorney, Agent, or Firm* — Brian A. Collins; Charles R. Malandra, Jr.; Steven J. Shapiro

(57) ABSTRACT

A method and system for performing monetary transactions across multiple source accounts. The method includes the steps of: determining whether a multi-source transaction is desired or required to complete a monetary transaction; selecting the specific source accounts to be accessed and debited to perform the monetary transaction; determining the amount of funds to be withdrawn from each of the source accounts; and communicating with the source accounts to (i) access the funds and (ii) determine whether adequate funds exist in each of the source accounts to perform the monetary transaction. When summed, the funds accessed from the multi-source accounts equal the total required to perform the monetary transaction. The final steps for completing the monetary transaction include approving the monetary transaction and transferring funds from the multiple source accounts to a single destination account. The funds may be drawn from the source accounts in accordance with a predetermined percentage defined by the holder/owner of the source accounts or based upon a specific input made by the holder/owner at the time of the monetary transaction. The system employs a communication link and processor to receive the various inputs of the account holder/owner to perform the monetary transaction.

15 Claims, 3 Drawing Sheets

| | % |
|---|---|
| DATE: NOV. 26, 2006<br>MSA<br>SELECT: | % |
| SAVINGS $500.00 | 25% |
| CHECKING $500.00 | 25% |
| CREDIT $1000.00 | 50% |
| TOTAL TRANSACTION<br>$2000.00<br>AUTHORIZATION #<br>1079211290010 | 100% |

FIG. 3

METHOD AND SYSTEM FOR PERFORMING MONETARY TRANSACTIONS FROM MULTIPLE SOURCE ACCOUNTS

TECHNICAL FIELD

The present invention relates generally to a method and system for conducting business transactions and, more particularly, to a method and system for performing monetary transactions from multiple source accounts to facilitate retail and commercial business transactions.

BACKGROUND OF THE INVENTION

Presently, funds for performing business transactions are generally debited from a single source. To perform any such transaction, adequate funds must be present or available through a line of credit, to complete the transaction. While various methods are available to transfer funds to a particular account, an adequate source of funds must be available to perform a particular transaction.

For example, to purchase a high-priced item such as an automobile or certain electronic equipment, e.g., a computer, funds must be collected in a central account or location so that the subsequent purchase transaction can occur. It is, therefore, common to have funds transferred from a savings or money market account to a checking account before a check can be issued to purchase the high ticket-price item. Various methods may be used to perform such funds transfers including Automated Teller Machines (ATMs) and on-line banking, i.e., using Internet connections to effect such transfers. Additionally, credits lines can be nearly instantaneously increased to provide the necessary funds to perform a transaction.

Along similar lines, a single check can be deposited to multiple accounts. For example, it is common to partition portions of a payroll check to be deposited in a savings, debit or checking account. As such, a holder of multiple accounts can supply each with a set or variable amount of funds to ensure adequate source funds are available to the account owner when performing subsequent monetary transactions.

While banks and lending institutions provide for the ability to transfer funds to a single account and for multiple accounts to be funded from a single source e.g., a payroll check, no methods currently provide for or envision a monetary transaction from multiple source accounts. That is, no method is available to purchase a large ticket-priced item from multiple accounts owned by the same (or with proper permissions) multiple individuals.

A need, therefore, exists for a method to perform monetary transactions from multiple source accounts thereby eliminating the need for funds transfers or to anticipate the funds necessary to perform subsequent business transactions.

SUMMARY OF THE INVENTION

A method and system is provided for performing monetary transactions across multiple source accounts. The method includes the steps of: determining whether a multi-source transaction is desired or required to complete a monetary transaction; selecting the specific source accounts to be accessed and debited to perform the monetary transaction; determining the amount of funds to be withdrawn from each of the source accounts; and communicating with the source accounts to (i) access the funds and (ii) determine whether adequate funds exist in each of the source accounts to perform the monetary transaction. When summed, the funds accessed from the multi-source accounts equal the total required to perform the monetary transaction. The final steps for completing the monetary transaction include approving the monetary transaction and transferring funds from the multiple source accounts to a single destination account. The funds may be drawn from the source accounts in accordance with a predetermined percentage defined by the holder/owner of the source accounts or based upon a specific input made by the holder/owner at the time of the monetary transaction. The system employs a communication link and processor to receive the various inputs of the account holder/owner to perform the monetary transaction.

BRIEF DESCRIPTION OF THE DRAWINGS

FIG. 3 is an exemplary transaction receipt produced in accordance with the inventive method.

BEST MODE TO CARRY OUT THE INVENTION

The present invention is described in the context of the purchase of a high priced ticket item such as a computer, though the invention is applicable to any monetary transaction which, in the opinion of a holder/owner of multiple asset sources, is preferably satisfied by funds across multiple source accounts. In the context used herein, multiple source accounts include any conventional monetary accounts including savings, debit, checking, money-market, credit, line-of-credit, etc., accounts.

Figure 1:
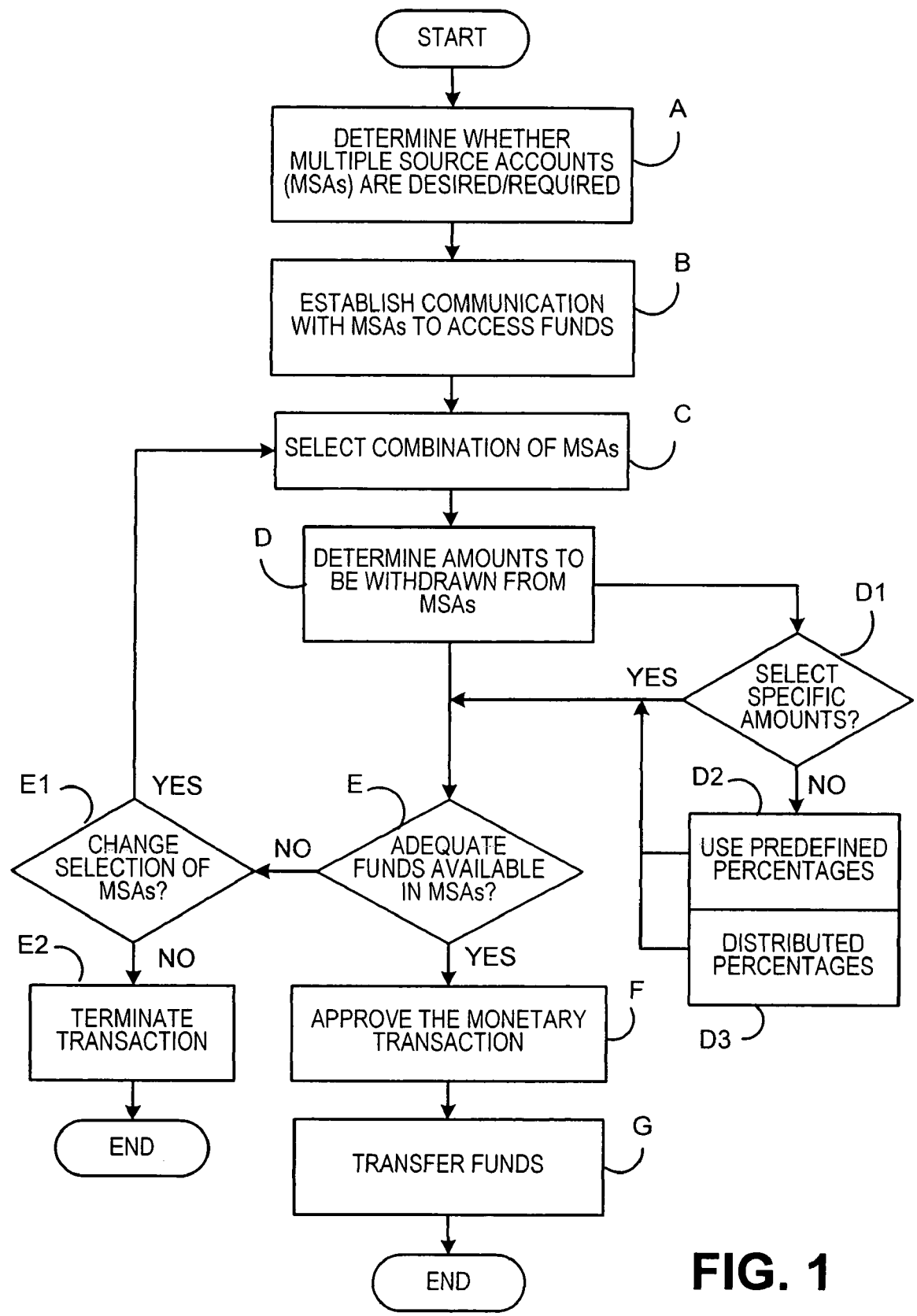
FIG. 1 depicts a flow diagram of an inventive method for performing monetary transactions from multiple source accounts.
Figure 2:
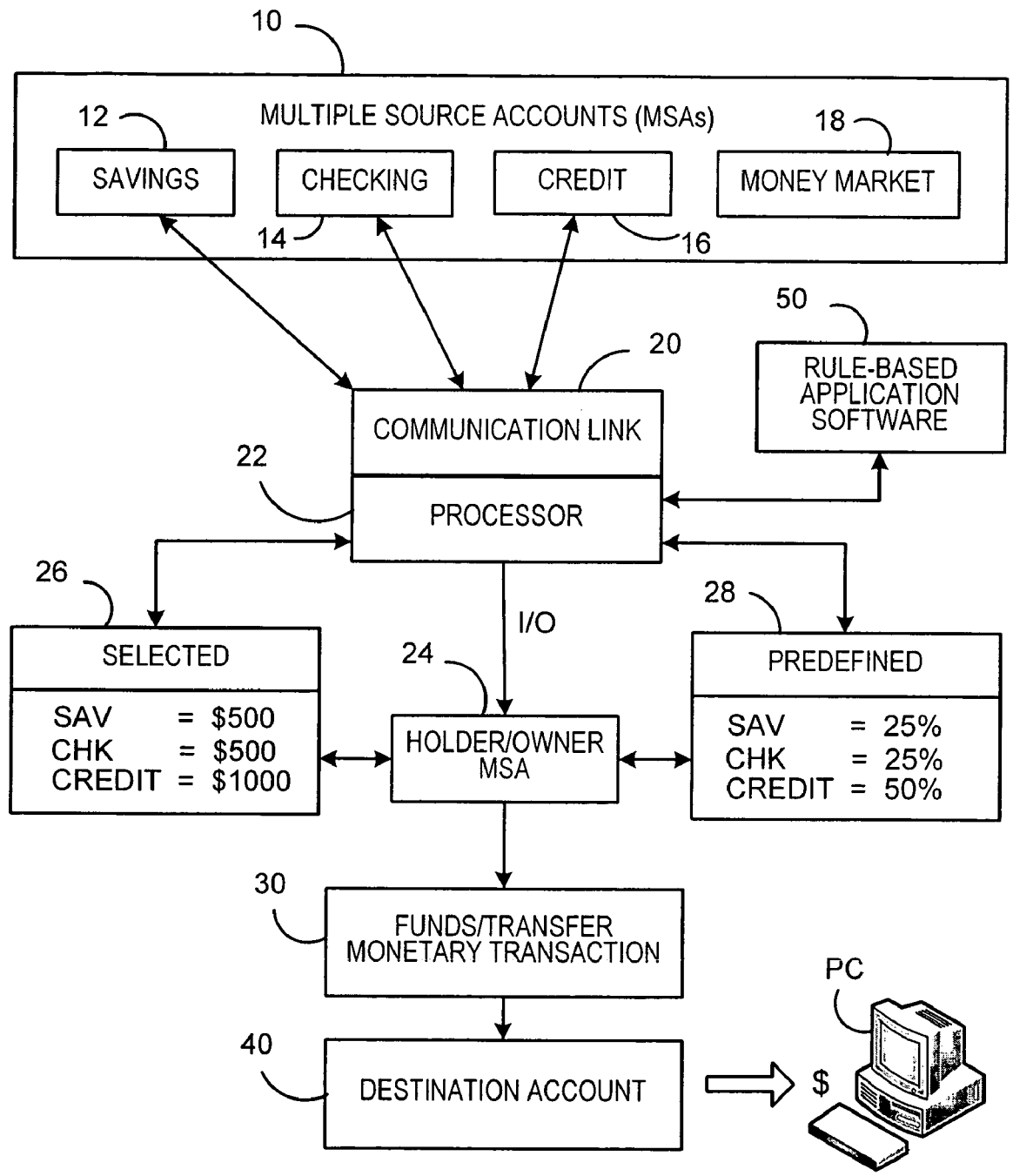
FIG. 2 is an illustration of various system components used to practice the method including multiple source accounts, a communication link and a processor to receive various operator inputs to perform the monetary transaction.

In FIGS. 1 and 2, the method according to the present invention is shown in both diagrammatic and pictorial format. FIG. 2 provides an example of various system elements/articles which may be used in the practice of the inventive method. More specifically, in step A, the holder/owner of Multiple Source Accounts (MSAs) 10 (see the example of FIG., 2) determines whether it is desired/required to purchase a personal computer system PC valued at, for example, two-thousand dollars ($2000.00 US) which includes tax and other fees, by funds available from the various accounts 12, 14 and 16. For the purposes of illustration, the source accounts include a savings account 12, a checking account 14, a credit account 16 and a money market account 18. Furthermore, the savings account 12 contains seven-hundred fifty US dollars ($750.00 US), the checking account 14 contains fifteen hundred US dollars ($1500.00 US), the credit account 16 has an available credit line of two thousand US dollars ($2,000.00 US) and the money-market account 18 comprises an additional two-thousand US dollars ($2000.00 US).

In step B, a conventional communication link/network 20 is employed to access and transfer funds from the various source accounts 10. The communication link 20 may be a conventional electronic dial-up, Internet communication link, cable or wireless/satellite connection to access the information and funds available. Furthermore, a processor 22 is operative to receive inputs from a holder/owner of the various source accounts 10 to perform the monetary transaction.

In step C, the holder/owner 24 may select multiple accounts, e.g., three (3) of the four (4) accounts, from which funds are to be withdrawn to purchase the personal computer system PC. More specifically, the holder/owner 24 may elect to withdraw funds from the savings account 12, checking account 14 and credit account 16. Such selections will typically be made via a conventional I/O device such as a keypad or touch screen (not shown) in communication with the processor 22.

In step D, the amount of funds to be withdrawn from each of the multiple source accounts 12, 14 and 16 may then be determined by the holder/owner 24. In a first embodiment of the invention, and referring to step D1, the holder/owner 24 may select a specific dollar amount (shown in block 26 of FIG. 2) to be debited from each of the accounts 12, 14, and 16, which, when summed equal the total required to complete the monetary transaction. For example, to purchase the personal computer system PC valued at two-thousand US dollars ($2000.00 US), the holder/owner 24 may elect to withdraw five-hundred US dollars ($500.00 US) from the savings account 12, five-hundred US dollars ($500.00 US) from the checking account 14, and one thousand US dollars ($1000.00 US) from the credit account 16.

Alternatively, in step D2, the holder/owner may elect a predefined percentage to be withdrawn (depicted in block 28a of FIG. 2) from the various source accounts 12, 14 and 16. For example, the holder/owner 24 may have previously elected to, for any particular transaction, withdraw twenty-five percent (25%) from the savings account 12, twenty-five percent (25%) from the checking account 14, and fifty percent (50%) from the credit account 16. Hence, one-quarter or five hundred US dollars ($500.00 US) may be debited from the savings account 12, another quarter or five-hundred US dollars ($500.00 US) may be debited from the checking account 14, and the remaining one-half or one thousand US dollars ($1,000.00 US) may be debited from the credit account 16.

In yet another embodiment and referring to step D3, the predefined percentage may be distributed based upon the total funds available in the source accounts selected (depicted in block 28b of FIG. 2). For example, if the total funds to be withdrawn from the various source accounts 12, 14 and 16 is two-thousand US dollars ($2,000.00) and the total funds available from the source accounts 12, 14, 16 is forty-two hundred and fifty US dollars ($4,250.00 US), then the distributed percentage from each account is about forty-seven and one-tenth percent (47.1%), or three-hundred and fifty-three US dollars ($353.00 US) from the savings account 12, seven-hundred and six US dollars ($706.00 US) from the checking account and nine-hundred and forty-one US dollars ($941.00 US) from the credit account.

Based upon the amounts available in each of the source accounts 12, 14, and 16, the processor 22 may perform calculations to determine the specific amount to be debited from each of the accounts 12, 14 and 16. These calculations are prescribed by the previous steps D1, D2, D3 above. In step E, the calculations may reveal that the amounts available are inadequate to perform the monetary transaction. In step E1, however, the holder/owner 24 may be asked to select an additional or a different composition or combination of source accounts 10 to complete the monetary transaction. For example, the holder/owner may elect to include the money market account 18 in the transaction to cover any deficiency of funds. Alternatively, if no other selections are made or are possible to be made, then a message to terminate the transaction may be issued in step E2.

Upon performing the account selection and funds availability steps described above, the holder/owner 24 then completes the transaction by a conventional approval process in step F. Conventional security will normally be applied such as through a Personal Identification Number (PIN), password, electronic signature, biometric or other security measure. In a final step G, the approval signal is issued by the processor 22, across the communication link 20, to transfer funds from the multiple source accounts 10 to a single destination account 40. As such, this essentially completes the purchase of the personal computer system PC.

Of course, the processor 22 may also issue a receipt indicating which source accounts were accessed and the amount of funds withdrawn from each. FIG. 3 depicts a typical receipt 60 evidencing the source accounts accessed, i.e., the savings, checking and credit accounts 12, 14, 16. Further, the actual fund amounts and/or the funds withdrawn as a percentage of the total transaction may be indicated.

While the holder/owner 24 will generally select and/or determine the amounts and/or percentages to be withdrawn from the various accounts, the processor 22/communication network 20 may access a rule-based application software 50 containing program code to perform certain optimization algorithms. More specifically, feedback can be provided to the holder/owner 24 concerning the most advantageous and/or least detrimental withdrawal of funds based upon certain interest accrual or interest fee characteristics of the selected source accounts 10. For example, if the savings account 12 generates interest at four percent (4%) per annum and the checking account 14 yields no interest, then the application software 50 may result in a recommendation that a greater proportion of funds be withdrawn from the checking account 14 in view of its lack of bearing interest income. On the other hand, if one of two credit accounts offers a lower interest fee than another, e.g., one charging twelve percent (12%) interest as compared to another which charges eighteen percent (18%) interest, then the application software 50 may affect a recommendation to make payment from the credit account which charges the lower rate of interest.

While the multiple source accounts may be accessed via an Internet communication link, e.g., viewing a computer screen to access a plurality of accounts, the source accounts may also be accessed by means of a dedicated Multiple Source Account (MSA) access card, e.g., a card containing a magnetic strip, microchip or Radio Frequency Identification (RFID) device. The MSA card would be preprogrammed to access various accounts owned by the card holder. A transaction may then be performed via a conventional card reader (not shown in the figures) which may present various options to the card holder regarding the preprogrammed accounts to be contacted/accessed.

Furthermore, while the multiple source accounts have been described in the context of a common holder/owner 24, it should be appreciated that the multiple source accounts may be held/owned by multiple individuals/entities, e.g., a husband and wife, a parent and child, a corporation and an affiliate/subsidiary, etc. Of course, should the multiple accounts be held in the names of several individuals/entities, prior or pre-existing approvals/permissions would be necessary to prohibit fraud, theft or misappropriation of funds.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is:

1. A method for performing a monetary transaction across multiple source accounts, comprising the steps of:
    providing a processor/communication network containing program code operative to process command signals of an operator;
    communicating with at least two source accounts through the processor/communication network to access funds contained therein;
    selecting at least two source accounts to be accessed and debited to perform the monetary transaction;
    determining an amount of funds to be withdrawn from the at least two source accounts, which when summed, equal the total required to perform the monetary transaction;
    determining whether adequate funds are available in the source accounts to perform the monetary transaction;
    approving the monetary transaction;
    transferring funds from the at least two source accounts through the processor/communication network to a single destination account to complete the monetary transaction.

2. The method according to claim 1 further comprising the step of:
    providing evidence that funds were withdrawn from selected source accounts and the amount debited from each of the selected source accounts.

3. The method according to claim 1 wherein the step of determining an amount to be withdrawn from each of the multiple source accounts includes the step of communicating a specific amount of funds to be debited from at least one of the multiple source accounts.

4. The method according to claim 1 wherein the step of determining an amount to be withdrawn from each of the multiple source accounts includes predefining a percentage of funds to be debited from each account upon receiving a request to perform a multi-source monetary transaction.

5. The method according to claim 1 wherein the predefined percentage is distributed based upon the total funds available from the multiple source accounts.

6. The method according to claim 1 including the step of selecting a different composition of source accounts if adequate funds do not exist in at least one of the previously selected source accounts.

7. The method according to claim 1 wherein the step of selecting the source accounts further includes the step of selecting each of the source accounts based upon interest accrual characteristics of the source accounts.

8. The method according to claim 1 wherein the step of selecting the source accounts further includes the step of selecting each of the source accounts based upon interest fee characteristics of the source accounts.

9. The method according to claim 7 wherein the step of selecting the source accounts further includes the step of selecting each of the source accounts based upon interest fee.

10. A system for performing a monetary transaction across multiple source accounts, comprising:
    a plurality of source accounts containing electronically transferable funds, the source accounts;
    a communication network for accessing and transferring the electronically transferable funds and
    a processor operative to receive inputs from the holder/owner to perform the monetary transaction, the inputs including a selection of at least two source accounts and a determination of the amount of funds to be withdrawn from the at least two source accounts, the processor, furthermore, operative to determine whether adequate funds are available to perform the monetary transaction and issuing an approval signal across the communication network to transfer funds from the at least two source accounts to a single destination account.

11. The system according to claim 10 wherein the processor is operative to provide evidence that funds were withdrawn from the selected source accounts and the amount debited from each of the selected source accounts.

12. The system according to claim 10 wherein the processor is operative to provide the holder/owner with an indication that the source accounts contain inadequate funds and provide the holder/owner with an option to select a different composition of source accounts.

13. The system according to claim 10 wherein the processor contains program code operative to optimize the selection of source accounts based upon interest accrual characteristics of the source accounts.

14. The system according to claim 10 wherein the processor contains program code operative to optimize the selection of source accounts based upon interest fee characteristics of the source accounts.

15. The system according to claim 13 wherein the processor contains program code operative to optimize the selection of source accounts based upon interest fee characteristics of the source accounts.

* * * * *